US010488558B2

(12) United States Patent
Taira et al.

(10) Patent No.: US 10,488,558 B2
(45) Date of Patent: Nov. 26, 2019

(54) PHOTOSENSITIVE RESIN COMPOSITION AND ANTIREFLECTION FILM

(71) Applicants: Nippon Kayaku Kabushiki Kaisha, Chiyoda-ku, Tokyo (JP); Polatechno Co., Ltd., Joetsu-shi, Niigata (JP)

(72) Inventors: Yoshihiko Taira, Tokyo (JP); Ryota Nakashima, Tokyo (JP)

(73) Assignees: Nippon Kayaku Kabushiki Kaisha, Tokyo (JP); Polatechno Co., Ltd., Niigata (JP)

(*) Notice: Subject to any disclaimer, the term of this patent is extended or adjusted under 35 U.S.C. 154(b) by 161 days.

(21) Appl. No.: 14/405,898

(22) PCT Filed: Jul. 19, 2013

(86) PCT No.: PCT/JP2013/069636
§ 371 (c)(1),
(2) Date: Dec. 5, 2014

(87) PCT Pub. No.: WO2014/017396
PCT Pub. Date: Jan. 30, 2014

(65) Prior Publication Data
US 2015/0148474 A1 May 28, 2015

(30) Foreign Application Priority Data

Jul. 24, 2012 (JP) .................................. 2012-163192

(51) Int. Cl.
*C08L 33/16* (2006.01)
*G02B 1/111* (2015.01)
*G02B 1/14* (2015.01)
*G02B 1/18* (2015.01)
*G02B 1/10* (2015.01)
*G02B 5/02* (2006.01)
*B32B 27/30* (2006.01)
*C08L 33/14* (2006.01)
*C08F 216/12* (2006.01)
*C08F 222/10* (2006.01)

(52) U.S. Cl.
CPC ............ *G02B 1/111* (2013.01); *B32B 27/308* (2013.01); *C08L 33/14* (2013.01); *G02B 1/105* (2013.01); *G02B 1/14* (2015.01); *G02B 1/18* (2015.01); *G02B 5/021* (2013.01); *B32B 2307/40* (2013.01); *C08F 216/125* (2013.01); *C08F 222/1006* (2013.01); *C08F 2222/1066* (2013.01); *C08L 33/16* (2013.01); *G02F 2201/38* (2013.01); *Y10T 428/3154* (2015.04); *Y10T 428/31504* (2015.04)

(58) Field of Classification Search
None
See application file for complete search history.

(56) References Cited

U.S. PATENT DOCUMENTS

| 5,387,463 A * | 2/1995 | Nakamura ............... B32B 23/08 427/164 |
| 2001/0050741 A1 | 12/2001 | Hokazono et al. |
| 2012/0003436 A1 * | 1/2012 | Saie .................. G03F 7/0007 428/195.1 |

FOREIGN PATENT DOCUMENTS

| JP | 2001-264508 A | | 9/2001 |
| JP | 2002-277604 A | | 9/2002 |
| JP | 2003-147268 A | | 5/2003 |
| JP | 2005-29743 A | | 2/2005 |
| JP | 2005-36105 A | | 2/2005 |
| JP | 2006-193465 A | | 7/2006 |
| JP | 2009-29979 A | | 2/2009 |
| JP | 2009029979 A | * | 2/2009 |
| JP | 2010-143092 A | | 7/2010 |
| JP | 2010143092 A | * | 7/2010 |
| JP | 2010-254950 A | | 11/2010 |
| JP | 2011-8275 A | | 1/2011 |
| JP | 2011-213818 A | | 10/2011 |
| WO | 2011/013611 A1 | | 2/2011 |

OTHER PUBLICATIONS

Deželić, G. et al., "Determination of Size of Small Particles by Light Scattering. Experiments on Ludix Colloidal Silica", Kolloid-Zeitschrift 1960, 173(1), 38-48.*
International Search Report and Written Opinion dated Oct. 15, 2013 in corresponding PCT application PCT/JP2013/069636.
International Preliminary Report on Patentability dated Feb. 5, 2015 in corresponding PCT application PCT/JP2013/069636.
Japanese communication, with English translation, dated Oct. 17, 2017 in corresponding Japanese patent application No. 2014-526894.

* cited by examiner

*Primary Examiner* — Richard A Huhn
(74) *Attorney, Agent, or Firm* — Nields, Lemack & Frame, LLC

(57) ABSTRACT

[Problem] To provide: a photosensitive resin composition which is cured by radiation and exhibits excellent wear resistance, antifouling properties, marker pen ink wiping-off properties, fingerprint wiping-off properties and low refractive index, and which provides low reflectance in cases where the photosensitive resin composition is used for an antireflection film; and an antireflection film which has a cured coating film of this photosensitive resin composition. [Solution] A photosensitive resin composition for an antireflection film that is characterized in that a low refractive index layer contains an acrylate, a colloidal silica, and an organic modified dimethyl polysiloxane having an acryloyl group and an acrylate-modified perfluoropolyether that serve as surface modification agents; and an antireflection film which is obtained by curing the photosensitive resin composition.

8 Claims, No Drawings

PHOTOSENSITIVE RESIN COMPOSITION AND ANTIREFLECTION FILM

TECHNICAL FIELD

The present invention relates to an antireflection film to be applied on the surface of a cathode ray tube display (CRT), plasma display panel (PDP), liquid crystal display screen (LCD), organic electroluminescence (organic EL), or other such surface that is capable of improving the scratch resistance and antifouling property of the surface together with lowering the reflectance.

BACKGROUND ART

Progress has been made in recent years in increasing the screen size and thinning plasma displays and liquid crystal displays. Given the high image quality of these displays, the glare of light and objects on the screen greatly affects the appearance of the image, making it necessary to impart antireflection performance.

PDP, LCD, and other such displays provided with a film obtained by coating with a hard coat agent in recent years also caused problems such as difficulty seeing the display screen due to reflection and a tendency to eye fatigue, necessitating hard coat treatment having surface antireflection performance, depending on the use. Methods of preventing surface reflection include a method of coating a composition of matter wherein inorganic fillers or organic fillers are dispersed in a photosensitive resin on top of the film to impart unevenness to the surface and prevent reflection (AG treatment), a method of providing a multilayered structure in the order high refractive index layer, low refractive index layer on the film and preventing glare and reflection utilizing light interference due to the difference in refractive index (AR treatment), AG/AR treatment combining the two above methods, and the like.

The increased mounting of touch panels on displays in recent years has also led to many instances of adhesion of fingerprints, sebum, perspiration, cosmetics, and other such soiling through direct contact of a person with the display. Once such soil has adhered, it is not easy to remove. Soil and scratches are also conspicuous since many displays are used in environments, whether indoors or outdoors, where external light is incident.

Optical films endowed with an antireflection function as well as scratch resistance and antifouling property are required for display panels to solve these problems.

In Patent Reference 1, providing an antifouling layer on a low refractive index layer makes it difficult for fingerprints, sebum, and the like to adhere, but providing an antifouling layer is related to deterioration of productivity. In Patent Reference 2, silicone oil is added to a low refractive index layer, and the slipperiness of the surface is said to improve. However, silicone has the property of tending to hold fingerprints, and the drawback is that it is not easy to wipe away fingerprints on the surface. In Patent Reference 3, many of the above problems are solved, but it is difficult to call the scratch resistance and chemical resistance adequate.

PRIOR ART REFERENCES

Patent References

Patent Reference 1: JP2002-277604A
Patent Reference 2: JP2003-147268A
Patent Reference 3: JP2011-8275A

SUMMARY OF THE INVENTION

Problems to be Solved By the Invention

The problems to be solved by the invention are that light reflects and makes the screen difficult to see and scratches and soil due to touching by hand are conspicuous when an antireflection film is used on a display surface.

Means Used to Solve the Above-Mentioned Problems

Specifically, the antireflection film of the present invention is characterized in that it is constructed by sequential lamination of a hard coat layer and a low refractive index layer from the substrate film side on a substrate film and that the low refractive index layer is formed from a resin composition containing acrylate, colloidal silica, silicon compound, and fluorine compound.

The present invention relates to:

(1) A photosensitive resin composition for an antireflection film, comprising a polyfunctional (meth)acrylate having at least three (meth)acryloyl groups in the molecule, colloidal silica, and an organic modified dimethylpolysiloxane having an acryloyl group and an acrylate-modified perfluoropolyether as surface modifying agents, (2) the photosensitive resin composition according to (1) wherein the content of organic modified dimethylpolysiloxane having an acryloyl group is 0.01%-30% relative to 100 wt % of the solids content of the photosensitive resin composition and the content of acrylate-modified perfluoropolyether is 0.01-30% relative to 100 wt % of the solids content of said composition, (3) the photosensitive resin composition according to (1) or (2) wherein the refractive index of the colloidal silica is within the range of 1.20-1.45, (4) the photosensitive resin composition according to any one of (1) to (3) wherein the content of colloidal silica is 10-90 wt % relative to 100 wt % of the solids content of the photosensitive resin composition, (5) an antireflection film obtained by curing a photosensitive resin composition according to any one of (1) to (4), (6) an antireflection film comprising a substrate film, a hard coat layer, and a low refractive index layer wherein the hard coat layer and low refractive index layer are laminated sequentially on the substrate film and the low refractive index layer has a refractive index lower than the hard coat layer, (7) the antireflection film according to (6) wherein the low refractive index layer comprises the photosensitive resin composition according to any one of (1) to (4), (8) the antireflection film according to (6) or (7) wherein the film thickness of the low refractive index layer is from 0.05 µm to 0.15 µm and the film thickness of the hard coat layer is from 0.1 µm to 30 µm, (9) the antireflection film according to any one of (6) to (8) wherein the hard coat layer has an antiglare property,

(10) the antireflection film according to any one of (6) to (9) wherein the refractive index in the low refractive index layer is 1.45 or lower,

(11) the antireflection film according to any one of (5) to (10) wherein the contact angle with water is 90° or higher and the contact angle with oleic acid is 50° or higher,

(12) a display device comprising an antireflection film according to any one of (5) to (11).

Advantages of the Invention

The antireflection film of the present invention has advantages such as high pencil hardness, excellent scratch resistance, high contact angle, good chemical resistance, and good marker pen wipeability, and also suppresses the reflection of light by being affixed to a display surface and makes scratches and soil less noticeable.

BEST MODE FOR CARRYING OUT THE INVENTION

Examples of the substrate film used in the present invention include polyester, polypropylene, polyethylene, polyacrylate, polycarbonate, triacetyl cellulose, polyethersulfone, cycloolefin polymers, and the like. The substrate film may also be in the form of a sheet of a certain thickness. The substrate film used may be provided with color and an easy-adhesion layer and may have been surface treated by corona treatment or the like.

A polyfunctional (meth)acrylate having at least three (meth)acryloyl groups in the molecule is used in the photosensitive resin composition of the present invention. Examples of polyfunctional (meth)acrylates include polyfunctional urethane (meth)acrylates which are the reaction product of polyfunctional (meth)acrylates having a hydroxyl group (pentaerythritol tri(meth)acrylate, dipentaerythritol penta(meth)acrylate, tripentaerythritol hepta(meth)acrylate, and the like) and polyisocyanate compounds (tolylene diisocyanate, isophorone diisocyanate, xylylene diisocyanate, hexamethylene diisocyanate, and the like); polyester acrylates such as trimethylolpropane tri(meth)acrylate, trimethylolpropane polyethoxy tri(meth)acrylate, pentaerythritol tri (meth)acrylate, pentaerythritol tetraacrylate, ditrimethylolpropane tetra(meth)acrylate, dipentaerythritol hexa(meth)acrylate, tripentaerythritol octa(meth)acrylate, and the like; tris(acryloxyethyl)isocyanurate, and the like. Furthermore, these may be used individually or in mixtures of two or more types.

The amount of polyfunctional (meth)acrylate component used in the photosensitive resin composition of the present invention is usually 10-80 wt %, preferably 20-70 wt %, relative to the solids content of the photosensitive resin composition of the present invention.

Colloidal silica having a nanoporous structure with an average particle size of 1-200 nm is used in the photosensitive resin composition of the present invention. Examples of colloidal silica having a nanoporous structure include porous silica and hollow silica. While ordinary silica particles have a refractive index of about n=1.46, the refractive index of silica particles having air with a refractive index of n=1 inside is n=1.2-1.45.

The colloidal silica of the present invention can be a colloidal solution of colloidal silica dispersed in a solvent or dispersing solvent-free fine powdered colloidal silica. Concrete examples of colloidal solutions of colloidal silica dispersed in a solvent include the ELCOM series, Sluria series, and the like manufactured by JGC Catalysts and Chemicals Industries.

Water, alcohols such as methanol, ethanol, isopropanol, n-butanol and the like; polyhydric alcohols and derivatives thereof such as ethylene glycol, ethylene glycol monoethyl ether, propylene glycol monomethyl ether, propylene glycol monomethyl ether acetate and the like; ketones such as methyl ethyl ketone, methyl isobutyl ketone, cyclohexanone, dimethyl acetamide and the like; esters such as ethyl acetate, butyl acetate and the like; nonpolar solvents such as toluene, xylene and the like; (meth)acrylates such as 2-hydroxybutyl (meth)acrylate, 2-hydroxypropyl(meth) acrylate, 4-hydroxybutyl (meth)acrylate and the like; and other common organic solvents can be used as the dispersing solvent of the colloidal solution of colloidal silica dispersed in a solvent. The amount of dispersing solvent is usually 100-900 wt % relative to 100 wt % of colloidal silica.

The average particle size in the present invention means the particle size of the smallest particles when the aggregate has broken down, and the average particle size of colloidal silica can be measured by the BET method. One having an average particle size of 1-200 nm must be used as this colloidal silica. Preferably, colloidal silica having an average particle size of 5-100 nm, more preferably an average particle size of 10-80 nm, is used.

The content of colloidal silica in the photosensitive resin composition of the present invention is usually 10-90 wt %, preferably 20-80 wt %, and more preferably 30-70 wt %, taking the solids content of the photosensitive resin composition as 100 wt %.

The surface of the colloidal silica can also be treated by a silane coupling agent or the like, and the dispersiveness can be improved. Treatment can be conducted by a known method. Specifically, there is a dry method and a wet method. The dry method is a method for treating silica powder whereby a stock solution or solution of a silane coupling agent is uniformly dispersed in silica powder being stirred at high speed by a stirrer. The wet method conducts treatment by adding a silane coupling agent to a slurry obtained by dispersing silica in a solvent or the like and stirring. Either method may be used in the present invention.

Non-reaction bonding-type and reaction bonding-type fluorine compounds are used as fluorine compounds in the present invention. The reaction bonding-type is preferred, and a fluorine compound having a (meth)acryloyl group is more preferred. Examples include acrylate-modified perfluoropolyethers having an acryloyl group added to the end of a modified perfluoropolyether. Properties such as surface slipperiness, mold release property, antiblocking property, fingerprint resistance, marker pen wipeability, fingerprint wipeability, and the like can be imparted by making the fluorocarbon long and increasing the fluorine content. Raising the organic modification rate can also improve the compatibility, re-coatability, and printability. Examples of commercial products of these reaction bonding-type fluorine compounds include OPTOOL DAC and OPTOOL DAC-HP manufactured by Daikin Industries, Ltd., Megaface RS-75 and RS-76, Defensa TF 3028, Defensa TF 3001, and Defensa TF 3000 manufactured by Dainippon Ink & Chemicals, Inc., SUA 1900L10 and SUA 1900L6 manufactured by Shin-nakamura Chemical Co., Ltd., UT 3971 manufactured by Nippon Gohsei, KNS 5300 manufactured by Shin-Etsu Silicone, and the like. These may be used individually or in mixtures of two or more types.

The content of organic modified dimethylpolysiloxane having an acryloyl group in the photosensitive resin composition of the present invention is usually 0.01-30 wt %, preferably 0.5-20 wt %, and more preferably 1-10 wt %, taking the solids content of the photosensitive resin composition as 100 wt %.

A non-reaction bonding-type or a reaction bonding-type silicon compound is used as the silicon compound in the present invention. A reaction bonding-type silicon compound is preferred, and a silicon compound having a (meth)

acryloyl group is more preferred. Examples of silicon compounds having a (meth)acryloyl group include those having an acrylate group added to the end of a modified polysiloxane skeleton, preferably an organic modified dimethylpolysiloxane having an acryloyl group. Examples include Tego Rad 2200, Tego Rad 2250, Tego Rad 2300, Tego Rad 2400, Tego Rad 2500, Tego Rad 2600, Tego Rad 2650, and Tego Rad 2700 manufactured by Evonik Degussa Japan Co., Ltd., BYK-3570 manufactured by Byk, and the like. These may be used individually or in mixtures of two or more types.

The content of acrylate-modified perfluoropolyether in the photosensitive resin composition of the present invention is usually 0.01-30 wt %, preferably 0.5-20 wt %, and more preferably 1-10 wt %, taking the solids content of the photosensitive resin composition as 100 wt %.

A photo-radical initiator is used in the photosensitive resin composition of the present invention. Examples of photo-radical polymerization initiators include benzoins such as benzoin, benzoin methyl ether, benzoin ethyl ether, benzoin propyl ether, benzoin isobutyl ether and the like; acetophenones such as acetophenone, 2,2-diethoxy-2-phenylacetophenone, 1,1-dichloroacetophenone, 2-hydroxy-2-methylphenylpropan-1-one, diethoxyacetophenone, 1-hydroxycyclohexylphenyl ketone, 2-methyl-1-[4-(methylthio)phenyl]-2-morpholinopropan-1-one and the like; anthraquinones such as 2-ethylanthraquinone, 2-t-butylanthraquinone, 2-chloroanthraquinone, 2-amylanthraquinone and the like; thioxanthones such as 2,4-diethylthioxanthone, 2-isopropylthioxanthone, 2-chlorothioxanthone and the like; ketals such as acetophenone dimethyl ketal, benzyl dimethyl ketal and the like; benzophenones such as benzophenone, 4-benzoyl-4'-methyldiphenylsulfide, 4,4'-bismethylaminobenzophenone and the like; phosphine oxides such as 2,4,6-trimethylbenzoyldiphenylphosphine oxide, bis(2,4,6-trimethylbenzoyl)-phenylphosphine oxide and the like.

Specifically, Irgacure 184 (1-hydroxycyclohexylphenyl ketone) and Irgacure 907 (2-methyl-1-(4-(methylthio)phenyl)-2-(4-morpholinyl)-1-propanone) manufactured by Ciba Specialty Chemicals, Lucirin TPO (2,4,6,-trimethylbenzoyldiphenylphosphine oxide) manufactured by BASF, and the like are readily available on the market. These may be used individually or in mixtures of two or more types.

The content of photo-radical initiator component in the photosensitive resin composition of the present invention is usually 0.1-10 wt %, preferably 1-5 wt %, relative to the solids content of the photosensitive resin composition.

A leveling agent, defoaming agent, ultraviolet absorber, photostabilizer, and the like can be added as needed to impart the respective functionalities to the photosensitive resin composition of the present invention. Examples of leveling agents include fluorine compounds, silicone compounds, acrylic compounds, and the like. Examples of ultraviolet absorbers include benzotriazole compounds, benzophenone compounds, triazine compounds, and the like. Examples of photostabilizers include hindered amine compounds, benzoate compounds, and the like.

A diluent can be used in the photosensitive resin composition of the present invention. Examples of diluents that can be used include lactones such as γ-butyrolactone, γ-valerolactone, γ-caprolactone, γ-heptalactone, α-acetyl-γ-butyrolactone, ε-caprolactone and the like; ethers such as dioxane, 1,2-dimethoxymethane, diethylene glycol dimethyl ether, diethylene glycol diethyl ether, diethylene glycol dibutyl ether, propylene glycol monomethyl ether, propylene glycol monoethyl ether, triethylene glycol dimethyl ether, triethylene glycol diethyl ether, tetraethylene glycol dimethyl ether, tetraethylene glycol diethyl ether and the like; carbonates such as ethylene carbonate, propylene carbonate, and the like; ketones such as methyl ethyl ketone, methyl isobutyl ketone, cyclohexanone, acetophenone and the like; phenols such as phenol, cresol, xylenol and the like; esters such as ethyl acetate, butyl acetate, ethyl lactate, ethyl Cellosolve acetate, butyl Cellosolve acetate, carbitol acetate, butyl carbitol acetate, propylene glycol monomethyl ether acetate and the like; hydrocarbons such as toluene, xylene, diethyl benzene, cyclohexane and the like; halogenated hydrocarbons such as trichloroethane, tetrachloroethane, monochlorobenzene and the like; organic solvents of petroleum-based solvents such as petroleum ether, petroleum naphtha and the like; fluorine-based alcohols such as 2H,3H-tetrafluoropropanol and the like; hydrofluoroethers such as perfluorobutylmethyl ether, perfluorobutylethyl ether and the like, and the like. These may be used individually or in mixtures of two or more types.

The amount of diluent component used in the photosensitive resin composition of the present invention is 0-99 wt % in the photosensitive resin composition.

The antireflection film of the present invention is obtained by providing a hard coat layer and a layer consisting of the above photosensitive resin composition sequentially on a substrate film (base film). The hard coat agent is applied on top of the substrate film so that the film thickness after drying is 0.1-30 μm, preferably 1-20 μm, more preferably 2-10 μm, and a cured film is formed by irradiating with radiation after drying. The photosensitive resin composition of the present invention is then applied on top of the hard coat layer formed so that the film thickness after drying is 0.05-0.15 μm (the film thickness is preferably set so that the wavelength that presents the minimum reflectance is 500-700 nm, more preferably 520-650 nm), and a cured film is formed by irradiating by radiation after drying.

The layer consisting of the above photosensitive resin composition (also referred to hereafter as "low refractive index layer") has a lower refractive index than the hard coat layer in the antireflection film of the present invention.

The refractive index of the low refractive index layer consisting of the photosensitive resin composition of the present invention is preferably 1.45 or lower, more preferably 1.42 or lower, to lower the reflectance.

The photosensitive resin composition used in the hard coat layer of the present invention contains an acrylate photosensitive resin, ultraviolet polymerization initiator, and a diluent of hydrocarbons such as toluene or ketones such as methyl ethyl ketone. An antiglare property can by imparted by making the surface uneven by dispersing an organic filler or inorganic filler in the photosensitive resin composition in this hard coat layer. These organic fillers or inorganic fillers can be used as a colloidal solution of particles dispersed in a solvent or as dispersing solvent-free fine powdered particles.

Styrene beads, melamine beads, acrylic beads, acrylic-styrene beads, polycarbonate beads, polyethylene beads, vinyl chloride beads, and the like are used as the organic filler used. The particle size of these plastic beads is 0.01-10 μm, more preferably 0.1-5 μm.

Examples of inorganic fillers include silica particles. The shape of the inorganic filler is not particularly restricted, and it is preferable to use, for example, any of spheres, plates, fibers, rods, amorphous, hollow, and the like. However, spheres are more preferred. The particle size is 0.01-10 μm, more preferably 0.1-5 μm.

A high refractive index layer having a refractive index of 1.55 or higher may be provided between the hard coat layer and the cured layer of the photosensitive resin composition of the present invention to lower the reflectance. In this case, a high refractive index coating agent having a refractive index of 1.55 or higher is applied so that the film thickness after drying is 0.05-5 μm, preferably 0.05-3 μm (the film thickness is preferably set so that the wavelength that presents the maximum reflectance is 500-700 nm), and a cured film is formed by irradiating by radiation after drying.

Metal oxides having an average particle size of 1-200 nm can be used as the material used in the high refractive index layer. Examples of the metal atom of the metal oxides include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, Ni, and the like. Tin oxide, indium tin oxide (ITO), antimony-doped tin oxide (ATO), zinc antimonate, aluminum-doped zinc oxide, phosphorus-doped tin oxide, and the like capable of imparting an antistatic property to the hard coat layer can be used more preferably. These can be obtained as micropowders or as dispersions dispersed in an organic solvent.

Examples of the method of applying the above photosensitive resin composition include bar coating, Meyer bar coating, air knife coating, gravure coating, reverse gravure coating, microgravure coating, reverse microgravure coating, die coating, vacuum die coating, dip coating, spin coating, and the like.

Examples of the radiation irradiated for curing include ultraviolet rays, electron beam, and the like. When cured by ultraviolet rays, a xenon lamp, high-pressure mercury lamp, metal halide lamp, and other such ultraviolet ray-irradiating device is used as the light source, and the intensity, position of the light source, etc. are adjusted as necessary.

Irradiating active energy rays in an inert gas-substituted environment and effecting curing are more preferred as the conditions during curing. The oxygen concentration is preferably 1 vol % or less, more preferably 0.5 vol % or less. Nitrogen gas is preferred as the inert gas used.

EXAMPLES

Example 1

One hundred parts by weight of DPHA (acrylate photosensitive resin, manufactured by Nippon Kayaku Co., Ltd.), 15 parts by weight of Nippseal SS-50B (silica particles having an average particle size of 1.7 μm, manufactured by Nippon Silica Industrial Co., Ltd.), and 5 parts by weight of an ultraviolet polymerization initiator were mixed together with toluene, and a coating solution for an antiglare hard coating having a solids content concentration of 50 wt % was prepared. The coating solution for an antiglare hard coat was applied by bar coater to one side of an 80 μm thick triacetyl cellulose film. After drying the solvent, curing was conducted by ultraviolet ray irradiation, and a triacetyl cellulose film having an antiglare layer with a finely uneven surface structure was obtained. 1.0 part by weight of a mixture of dipentaerythritol hexaacrylate and pentaacrylate (KAYARAD DPHA, manufactured by Nippon Kayaku Co., Ltd.), 8.5 parts by weight of Sluria (MIBK dispersion of nanoporous silica (solids content 20%, average particle size: 40-70 nm, manufactured by JGC Catalysts and Chemicals Industries), 0.75 part by weight of Tego Rad 2600 (organic modified dimethylpolysiloxane having an acryloyl group, manufactured by Evonik Degussa Japan) diluted to a solids content of 10% as surface modifying agent 1, 0.75 part by weight of OPTOOL DAC-HP (acrylate-modified perfluoropolyether, manufactured by Daikin Industries, Ltd.) diluted to a solids content of 10% as surface modifying agent 2, 0.075 part by weight of Irgacure 184 (manufactured by Ciba Specialty Chemicals), 0.075 part by weight of Irgacure 907 (manufactured by Ciba Specialty Chemicals), 39 parts by weight of methyl isobutyl ketone, and 50 parts by weight of methyl ether ketone were also mixed, and a photosensitive resin composition was obtained. The photosensitive resin composition obtained was applied to make a film thickness of approximately 0.1 μm on top of the above antiglare film. After drying at 80° C., it was cured by an ultraviolet ray irradiating device, and an antireflection film was obtained.

Example 2

An antireflection film was obtained in the same way as in Example 1 except that Megaface RS-75 (acrylate-modified perfluoropolyether, manufactured by Dainippon Ink & Chemicals, Inc.) was used as the surface modifying agent 2.

Example 3

An antireflection film was obtained in the same way as in Example 1 except that Megaface RS-76E (acrylate-modified perfluoropolyether, manufactured by Dainippon Ink & Chemicals, Inc.) was used as the surface modifying agent 2.

Example 4

An antireflection film was obtained in the same way as in Example 1 except that BYK-3570 (organic modified dimethylpolysiloxane having an acryloyl group, manufactured by Byk) was used as the surface modifying agent 1 and OPTOOL DAC-HP (acrylate-modified perfluoropolyether, manufactured by Daikin Industries, Ltd.) was used as the surface modifying agent 2.

Comparative Example 1

An antireflection film was obtained in the same way as in Example 1 except that only Tego Rad 2600 was used as a surface modifying agent.

Comparative Example 2

An antireflection film was obtained in the same way as in Example 1 except that only Megaface RS-75 was used as a surface modifying agent 2.

Comparative Example 3

An antireflection film was obtained in the same way as in Example 1 except that only Megaface RS-444 (perfluoroalkyl ethylene oxide adduct, manufactured by Dainippon Ink & Chemicals, Inc.) was used as a surface modifying agent.

Comparative Example 4

After adding and mixing 100 parts by weight of acryloyloxypropyltrimethoxysilane (KBM-5103, manufactured by Shin-Etsu Chemical Co., Ltd.) and 120 parts by weight of methyl ethyl ketone, and 3 parts by weight of diisopropoxyaluminum ethyl acetoacetate (trade name: Chelope EP-12, manufactured by Hope Chemical Co., Ltd.), stirring was performed while conducting reflux cooling. Thirty parts by weight of ion-exchanged water was added. After reacting for four hours at 60° C., the solution was cooled to room temperature, and sol solution a was obtained. A quantity of 3.3 parts by weight of KAYARAD DPHA, 40 parts by weight of Sluria, 0.7 part by weight of X22-164C (manufactured by Shin-Etsu Chemical Co., Ltd.), 0.2 part by weight of IRG. 907, and 299.6 parts by weight of MEK were mixed with 6.2 parts by weight of sol solution a, and a coating solution A for an antireflection film was obtained. A film was made in the same way as in Example 1, and an antireflection film was obtained.

(Total Light Ray Permeability)

Measured using a haze meter TC-H3DPK manufactured by Tokyo Denshoku Co., Ltd.

(Minimum Reflectance)

Measured using a UV, visible, and infrared spectrophotometer UV-3150 manufactured by Shimadzu.

(Pencil Hardness)

The pencil hardness of a coating film of the above composition was measured using a pencil hardness tester according to JIS K5400. More specifically, a pencil was placed at a 45° angle on a polyester film having the cured film to be measured, a 750 g load was applied from above, and the pencil was pulled about 5 mm. The result was expressed by the pencil hardness that did not produce a scratch at least four out of five times.

(Scratch Resistance)

A 250 g/cm² load was applied to steel wool #0000, and it was moved back and forth 10 times. The state of scratching was evaluated visually.
⊙: No scratches visible
○: 1-10 scratches
x: 10 or more scratches (Contact Angle)

The contact angles with pure water and oleic acid were measured using an automatic contact angle meter CA-V manufactured by Kyowa Interface Science. This was used as an assessment of water repellency and oil repellency. Water repellency=a higher contact angle with pure water is better; oil repellency=a higher contact angle with oleic acid is better.

(Chemical Resistance)

3% NaOH aqueous solution was applied dropwise to a film, and the state of the film surface was examined thirty minutes later.
○: No change
x: Discoloration or detachment of the film (Marker Pen Wipeability)

Characters were written on the coated surface using black marker pen ink (Marky Single-point Fine (trade name: manufactured by Zebra) and wiped by a Kimwipe. The wipeability was evaluated visually.
⊙: Could be wiped ten or more times
○: Could be wiped several to less than ten times
Δ: Could be wiped only once
x: Could not be wiped even once The results are shown in Table 1.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Additive 1 | Tego 2600 | Tego 2600 | Tego 2600 | BYK-3570 | Tego 2600 | RS-75 | F-444 | X22-164C |
| Additive 2 | DAC-HP | RS-75 | RS-76E | DAC-HP | — | — | — | — |
| Total light ray permeability (%) | 93 | 93 | 93 | 93 | 93 | 93 | 93 | 93 |
| Haze (%) | 7.9 | 8.0 | 8.0 | 7.9 | 8.0 | 7.9 | 7.9 | 9.5 |
| Minimum reflectance (%) | 1.44 | 1.44 | 1.43 | 1.45 | 1.44 | 1.46 | 1.47 | 1.53 |
| Pencil hardness 2H | ○ | ○ | ○ | ○ | ○ | X | ○ | ○ |
| Scratch resistance | ⊙ | ⊙ | ⊙ | ○ | ⊙ | X | X | X |
| Water contact angle (°) | 103.7 | 104.0 | 105.3 | 103.1 | 101.8 | 86.4 | 73.0 | 91.1 |
| Oleic acid contact angle (°) | 62.8 | 58.1 | 59.7 | 55.5 | 49.3 | 46.6 | 30.9 | 48.5 |
| Marker pen wipeability | ⊙ | ⊙ | ⊙ | ⊙ | ○ | X | X | Δ |
| Chemical resistance | ○ | ○ | ○ | ○ | X | ○ | X | X |

INDUSTRIAL APPLICABILITY

The antireflection property and scratch resistance can be improved and an antifouling property can be imparted by bonding to the surface of a cathode ray tube display, plasma display panel, liquid crystal display screen, organic electroluminescence and the like.

The invention claimed is:

1. An antireflection film comprising a substrate film, a hard coat layer, and a low refractive index layer wherein the hard coat layer and the low refractive index layer are laminated sequentially on the substrate film and the low refractive index layer has a refractive index lower than the hard coat layer, and wherein the low refractive index layer is obtained by curing a photosensitive resin composition for an antireflection film, the photosensitive resin composition for an antireflection film consisting of a polyfunctional (meth)acrylate having at least three (meth)acryloyl groups in the molecule, said polyfunctional (meth)acrylate being selected from the group consisting of a polyfunctional urethane (meth)acrylate which is a reaction product of a polyfunctional (meth)acrylate selected from the group consisting of pentaerythritol tri(meth)acrylate, dipentaerythritol penta(meth)acrylate and tripentaerythritol hepta(meth)acrylate and a polyisocyanate compound selected from the group consisting of tolylene diisocyanate, isophorone diisocyanate, xylylene diisocyanate and hexamethylene diisocyanate; trimethylolpropane tri(meth)acrylate, trimethylolpropane polyethoxy tri(meth)acrylate, pentaerythritol tri(meth)acrylate, pentaerythritol tetraacrylate, ditrimethylolpropane tetra(meth)acrylate, dipentaerythritol hexa(meth)acrylate, tripentaerythritol octa(meth)acrylate, and tris(acryloxyethyl)isocyanurate; colloidal silica, an organic modified dimethylpolysiloxane having an acryloyl group added to an end of the dimethylpolysiloxane, and an acrylate-modified perfluoropolyether having an acryloyl group added to an end of the perfluoropolyether as surface modifying agents, a photo-radical initiator and at least one member selected from the group consisting of a diluent, a leveling agent, a defoaming agent, an ultraviolet absorber and a photostabilizer, wherein the refractive index of the colloidal silica is within the range of 1.20-1.45, and wherein the content of the polyfunctional (meth)acrylate is 20-70% relative to 100 wt % of the solids content of the photosensitive resin composition, and the content of the acrylate-modified perfluoropolyether is 1-10% relative to 100 wt % of the solids content of the photosensitive resin composition, and wherein the hard coat layer is formed from an acrylate photosensitive resin composition having organic or inorganic filler particles dispersed therein to provide an antiglare property to said hard coat layer.

2. The antireflection film according to claim 1 wherein the film thickness of the low refractive index layer is from 0.05 μm to 0.15 μm.

3. The antireflection film according to claim 1 wherein the refractive index in the low refractive index layer is 1.45 or lower.

4. The antireflection film according to claim 1 wherein the contact angle with water is 90° or higher and the contact angle with oleic acid is 50° or higher.

5. The antireflection film according to claim 1, wherein the film thickness of the hard coat layer is from 0.1 μm to 10 μm.

6. The antireflection film according to claim 5, wherein the hard coat layer comprises an inorganic or organic filler having a particle size of 0.01-10 μm.

7. The antireflection film according to claim 1, wherein said acrylate photosensitive resin composition has organic filler particles, and wherein said organic filler particles are selected from the group consisting of acrylic beads, styrene beads and acrylic-styrene beads.

8. A display device comprising an antireflection film according to claim 1.

* * * * *